July 16, 1968 J. H. SWARBRICK 3,392,985
CHUCKS
Filed May 9, 1966
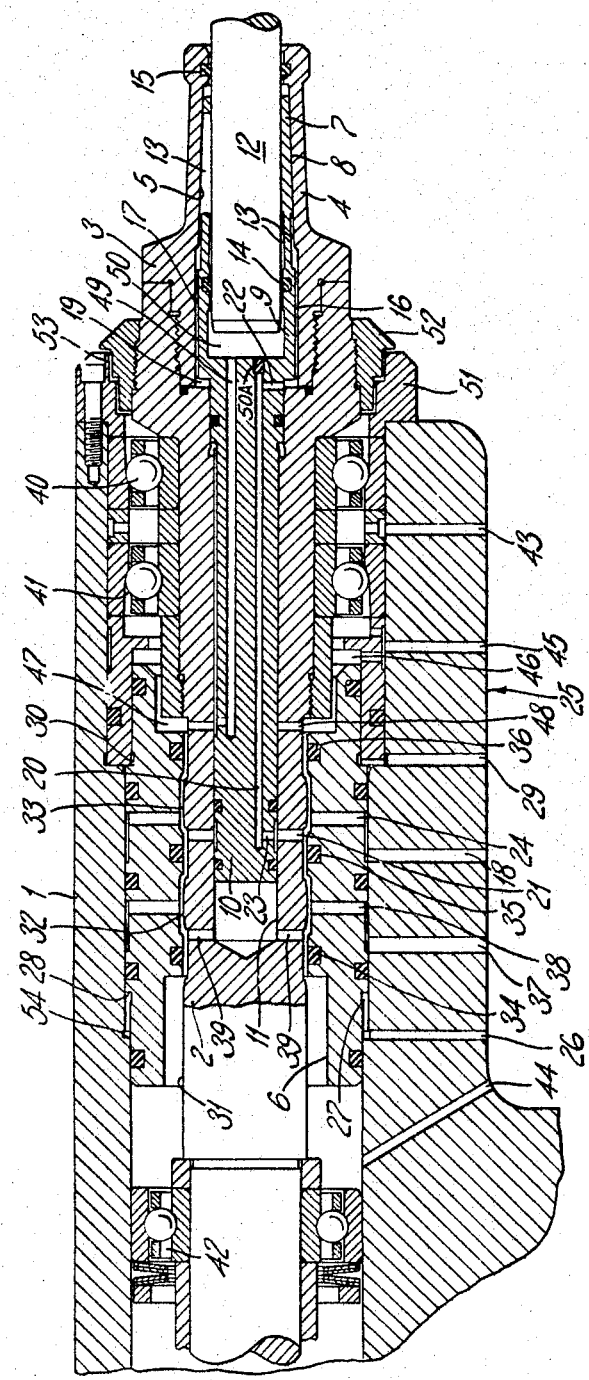
Inventor
Justin Henry Swarbrick
Watson, Cole, Grindle + Watson
Attorneys United States Patent Office 3,392,985
Patented July 16, 1968

3,392,985
CHUCKS
Justin H. Swarbrick, Deptford, London, England, assignor to Molins Machine Company Limited, London, England, a corporation of Great Britain
Filed May 9, 1966, Ser. No. 548,539
Claims priority, application Great Britain, May 14, 1965, 20,489/65
6 Claims. (Cl. 279—4)

This invention concerns improvements relating to a chuck for gripping a cutting tool or workpiece in a machine tool, and in particular to such a chuck for use in a numerically-controlled machine tool.

In United States Patent No. Re. 25,956, issued Feb. 22, 1966, to David T. N. Williamson, there is disclosed a numerically-operated multi-purpose machine tool for the production of batches of components. In this machine tool, down time or non-productive time has been reduced to a minimum by the provision of a chuck within the cutter head which can be programmed to select any one of a range of tools from a tool store conveniently placed nearby. The machine tool and its chuck can further locate the end of the tool in relation to the cutter head so that its position is fixed in all three planes of reference normally used in such machine tools, i.e. along X, Y and Z axes. This automatic location eliminates the use of setting up jigs or gauges and measuring instruments.

From this it follows that the chuck used to hold and locate the cutting tool should possess unusual features in that it has to fulfill its function with a high degree of accuracy. This invention sets out to provide such a chuck that possesses the functional features of locating the cutting tool with great accuracy combined with an ability to exert a high gripping force to resist the torque applied to the tool during the machining operation. A further desirable feature is that wear between moving components in that part of the apparatus which actually grips the cutting tool should be reduced to a minimum. Any sliding movement between moving and stationary parts when high radial pressures are acting leads to rapid wear which militates against the accuracy necessary throughout the apparatus. This invention further sets out to reduce friction from this and from other sources to a minimum.

According to the present invention there is provided in a machine tool apparatus for gripping a cylindrical object (e.g. the shank of a cutting tool or a workpiece) comprising an expandable socket, a pressure chamber one wall of which is provided by said socket, a split sleeve movable axially within said socket, means to apply pressure to said chamber so as to cause said socket to expand and means to cause said sleeve to move axially while said socket is expanded so that when the socket contracts pressure is applied radially inwards on said cylindrical object which has been inserted in said sleeve.

The internal surface of said socket and the external surface of said sleeve may be provided with mating tapers while the end of said chamber may be defined by deformable sealing rings. Pressure may be applied by means of a fluid medium. The socket may be fixed to a rotatable spindle.

Further according to the invention there is provided a tool holder and a tool to be gripped therein comprising an expandable cylindrical socket having a tapered internal surface, a split sleeve having a tapered external surface mating with that of said socket within which it is movable in an axial direction, an annular pressure chamber defined by said socket, the shank of the tool and two deformable sealing rings, means to apply pressure to said chamber so as to cause said socket to expand and means to cause said sleeve to move axially while said socket is expanded so that when the socket contracts pressure is applied radially inwards on said cylindrical object which has been inserted in said sleeve.

Apparatus in accordance with the invention will now be described by way of example with reference to the accompanying drawing which shows a section through part of a cutter head of a numerically controlled machine tool.

Reference 1 indicates the stationary body of the cutter head of a machine tool. Within this body 1 is a spindle 2 which is rotatable although the driving means (e.g. a pelton wheel as disclosed in the aforementioned co-pending application) are not shown. Screwed to the spindle 2 is a socket or chuck 3 provided with a relatively thin-walled barrel 4. The interior of the chuck 3 has a taper 5 the angle of which to the axis of the spindle 2 is of the order of 1°–2°.

Interposed between the body 1 and the spindle 2 is a sleeve 6 which is movable in an axial direction.

Reference 7 is a split sleeve or collet having an external taper 8 which mates with the taper 5 of the chuck 3. The collet 7 is joined by a ring 9 to a piston 10 which is slidable within a bore 11 of the spindle 2.

When a cutting tool shank 12 is inserted within the collet 7, an enclosed annular chamber 13 is formed between the chuck 3 and the shank 12, the ends thereof being enclosed by seals 14 and 15. Connecting means, i.e. ports 16 and 17, enable the chamber 13 to be put in communication with a valve opening 18 connected directly to a source, which is not shown, of high pressure hydraulic fluid at 10,000 p.s.i. through an intermediate annular space 19, an axial port 20 in the piston 10, a radial port 21 in the spindle 2, further radial ports 22 and 23 in the piston 10 and a radial port 24 in the sleeve 6.

The lower part of the body 1 is a block shown generally as 25 through which a series of ports to be described hereinafter has been drilled. These ports are connected to pressure sources through separate valves or through a combined shuttle valve. The pressure sources and the valve or valves are not shown and all operate in a known manner. The sleeve 6 can be moved forwardly, i.e. to the right as seen when looking at the drawing, by admitting hydraulic fluid at 2,000 p.s.i. through a port 26 to an annular space 27. The fluid acts against face 28 of the sleeve 6 which is thus forced in a forward direction, "forward" being defined as previously. To move the sleeve 6 in the reverse direction, hydraulic fluid at the same pressures of 2,000 p.s.i. is admitted through port 29 to act against face 30. The spindle 2 is provided with enlarged diameters 31, 32 and 33. The sleeve 6 is provided with sealing rings 34, 35 and 36. A port 37 in the block 25 communicates via passage 38 in the sleeve 6 and further passages 39 in the spindle 2 with the space behind the piston 10 in the bore 11.

The spindle 2 is rotatable within and is separated from the body 1 by means of three angular contact ball bearings 40, 41 and 42. Lubrication of these bearings is by means of a micro-mist fog admitted through ports 43 and 44. 45 is a further port for draining away lubricating oil from the bearings 40 and 41 and for hydraulic fluid spillage via annular spaces 46, 47, radial port 48, and passage 49 from space 50 behind the shank 12. A plug 50A in the forward end of the port 20 blocks communication between the port and the space 50. 51 and 52 are two elements fixed respectively onto the body 1 and the spindle 2 and form therebetween a labyrinthine passage 53 allowing air spillage but preventing the entry of foreign matter into the bearings 40 and 41.

The operation of the apparatus will now be described. To grip a tool the following sequence of operations is carried out automatically according to instructions received by a series of separate control valves or through a combined shuttle valve which either connect the ports of the block 25 to the appropriate source of hydraulic fluid or connect them to tank. The instructions are carried by the tape or other means controlling the numerically-controlled machine tool.

(1) The port 29 is opened to hydraulic pressure of 2,000 p.s.i. This pressure acts on the face 30 which causes the sleeve 6 to move to the left as seen when looking at the drawing and continues moving it until the face 28 abuts against face 54 of the cutter head body 1. Pressure on the face 30 holds the sleeve firmly in this position at the end of its permitted leftwise travel. In this position the sealing rings 34, 35 and 36 seal respectively on enlarged diameters 31, 32 and 33 of the spindle 2. The spaces between adjacent sealing rings are now enclosed chambers; i.e. the space between the sealing rings 34 and 35 forms a chamber communicating with the passages 38 and 39 only, while a similar chamber is formed between the sealing rings 35 and 36 communicating only with the passage 24 and radial openings 21.

(2) Insert the shank 12 of the cutting tool into the collet 7 which is already at the end of its leftwise (as seen when looking at the drawing) travel, having been left in this position as will be described hereinafter when the previous tool was removed.

(3) Open the port 18 to 10,000 p.s.i. hydraulic fluid pressure. This pressure is then transmitted to the enclosed chamber 13 via the passage 24, the chamber formed between the sealing rings 35 and 36, the radial openings 21, the port 23, the axial port 20, the port 22, the annular space 19 and the ports 16 and 17. As the fluid cannot pass between the shank 12 and the seals 14 and 15, which are special rubber rings face with PTFE, the 10,000 p.s.i. pressure acts outwards on the barrel 4 which is thereby caused to expand.

(4) By opening the port 37 to hydraulic fluid at 2,000 p.s.i. this pressure is transmitted via the passage 38, the chamber between the seals 34 and 35, and the passage 39 to the space behind the piston 10 which is thereby forced to move forwardly, i.e. to the right as seen when looking at the drawing. This movement continues until the collet 7 is forced home into the expanded chuck 3. At this stage there is a residual radial clamping force of the order of 100 p.s.i.

(5) The port 18 is closed to pressure and opened to tank, thus releasing pressure in the enclosed chamber 13. Since the barrel 4 has not been strained beyond its elastic limit it contracts and in so doing closes the split collet 7 which thereby grips the shank 12 firmly with a radial clamping of the order of 5,000 p.s.i.

(6) The port 37 is closed to pressure and opened to tank, thus releasing pressure from the space behind the piston 10.

(7) The port 29 is closed to pressure and opened to tank.

(8) The port 26 is opened to 2,000 p.s.i. pressure thus causing the sleeve 6 to move to the right by the action of the pressure against the face 28. This movement continues until the face 30 abuts against the cutter head body as shown in the drawing. With the sleeve 6 in this position the sealing rings 34, 35 and 36 are not in contact with the spindle 2 and cannot cause wear or frictional forces to act when the spindle 2 rotates.

The spindle 2 can now be caused to rotate and the machine can carry out its scheduled cutting operations.

To release the gripped shank 12 of a cutting tool a reverse procedure is initiated by the taped instructions. The following steps are carried out in the reverse order to those necessary for gripping the tool shank:

(a) The port 26 is closed to pressure and opened to tank.

(b) The port 29 is opened to pressure thus causing the sleeve 6 to move to its leftmost position.

(c) The port 37 is opened to pressure thus transmitting 2,000 p.s.i. to the space behind the piston 10.

(d) The port 18 is opened to pressure of 10,000 p.s.i. whereby fluid at the same pressure is transmitted as described hereinabove to the chamber 13. The barrel 4 again expands. The diameter of the piston passing through the annular space 19 is arranged to be slightly greater than the diameter of the tool shank 12. This leads to a resultant force acting to the left which causes the piston 10 and the collet 7 both to move to the limit of their leftwise motion when pressure on piston 10 is released.

(e) Close the port 18 to pressure and open to tank. The barrel 4 once again contracts but does not grip the collet 7. The cutting tool can thus be withdrawn.

(f) Remove the shank 12 of the tool.

(g) Close the port 29 to pressure and open to tank.

(h) Return the sleeve 6 to the limit of its travel to the right by operating the port 26.

The apparatus is now in a ready state to repeat the cycle of operations and to be used in any way considered desirable.

It will thus be seen that when the shank 12 of the tool is inserted into or withdrawn from the chuck 3 the collet 7 is always in a retracted position, thereby eliminating sliding movement between moving and stationary parts and reducing friction to a minimum. Once the tool is inserted into the expanded chuck 3 the latter is again contracted and the shank 12 is gripped by the collet 7 which does not move in an axial direction during the gripping action. Thus the chuck is able to locate the tool with a high degree of accuracy.

Although the description of the apparatus has been restricted to one type of machine tool, i.e. a milling machine as disclosed in the aforementioned patent it can be used equally well on other types of machine tool. In the same way the apparatus can be used in a lathe to select a workpiece from a stock of workpieces and to rotate the workpiece for machining or being fashioned into shape by other forming processes.

What I claim as my invention and desire to secure by Letters Patent is:

1. In a machine tool apparatus for gripping a cylindrical object comprising an expandable socket, a pressure chamber one wall of which is defined by said socket, a split sleeve movable axially within said socket, means to apply and release pressure to said chamber so as to cause said socket to respectively expand and contract and means to cause said sleeve to move axially while said socket is expanded so that when the socket contracts pressure is applied radially inwards on said cylindrical object which has been inserted in said sleeve.

2. Apparatus as claimed in claim 1, wherein the internal surface of said socket and the external surface of said sleeve are provided with mating tapers.

3. Apparatus as claimed in claim 2, wherein the ends of said chamber are defined by deformable sealing rings.

4. Apparatus as claimed in claim 3, wherein pressure is applied to said chamber by a fluid medium.

5. Apparatus as claimed in claim 4, wherein said socket is fixed to a rotatable spindle.

6. A tool holder and a tool to be gripped therein comprising an expandable cylindrical socket having a tapered internal surface, a split sleeve having a tapered external surface mating with that of said socket within which it is movable in an axial direction, an annular pressure chamber defined by said socket, the shank of the tool and two deformable sealing rings, means to apply and release pressure to said chamber so as to cause said socket to respectively expand and contract and means to cause said sleeve to move axially while said socket is expanded so that when the socket contracts pressure is applied radially inwards on said cylindrical object which has been inserted in said sleeve.

References Cited

UNITED STATES PATENTS

| 3,176,553 | 5/1965 | Schubert | 279—4 X |
| 3,250,542 | 5/1966 | Winnen | 279—4 |
| 3,361,433 | 1/1968 | Holdridge | 279—4 |

ROBERT C. RIORDON, *Primary Examiner.*

D. R. MELTON, *Assistant Examiner.*